Apr. 3, 1923.
R. S. SMITH ET AL
1,450,340
INTERMITTINGLY OPERATING MOTOR SYSTEM
Filed Oct. 20, 1919
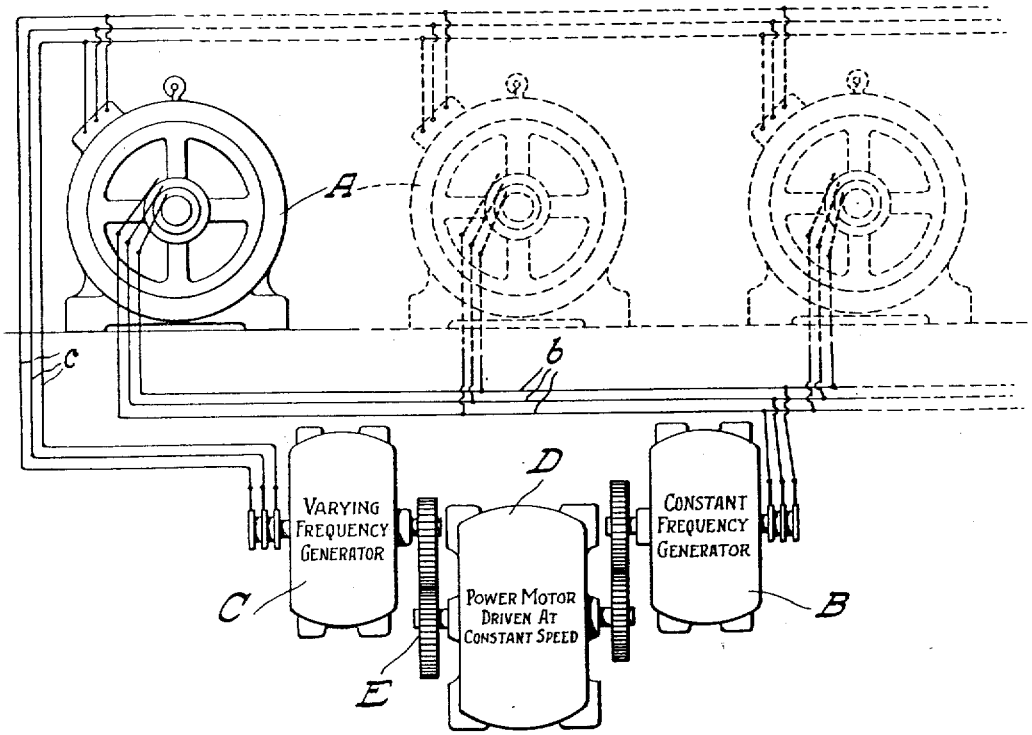
Fig. 1.
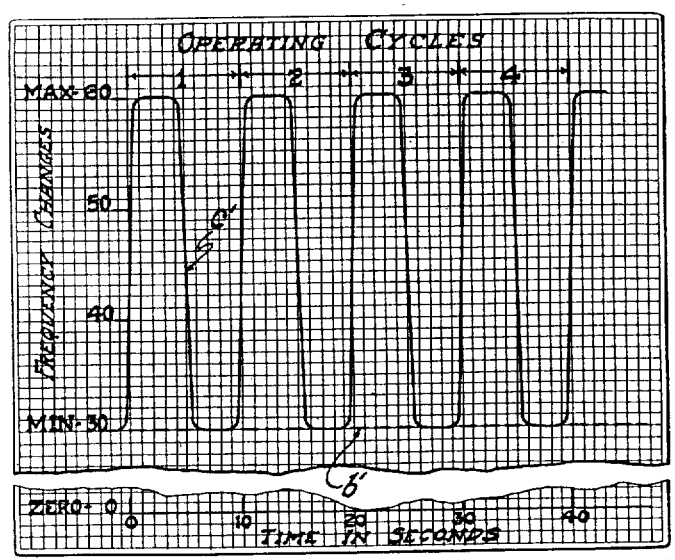
Fig. 2.
WITNESS
INVENTORS
R. Stanley Smith and
James L. Adams Jr.
BY
ATTORNEYS Patented Apr. 3, 1923.

1,450,340

UNITED STATES PATENT OFFICE.

REUBEN STANLEY SMITH AND JAMES L. ADAMS, JR., OF MILWAUKEE, WISCONSIN, ASSIGNORS TO A. O. SMITH CORPORATION, OF MILWAUKEE, WISCONSIN, A CORPORATION OF NEW YORK.

INTERMITTINGLY-OPERATING MOTOR SYSTEM.

Application filed October 20, 1919. Serial No. 331,824.

*To all whom it may concern:*

Be it known that we, REUBEN STANLEY SMITH and JAMES L. ADAMS, Jr., citizens of the United States, and residing in the city of Milwaukee, county of Milwaukee, and State of Wisconsin, have invented a new and useful Improvement in Intermittingly-Operating Motor Systems; and we do declare that the following is a full, clear, and exact description thereof, such as will enable persons skilled in the art to which the invention pertains to make and use the same, reference being had to the drawings hereto attached and forming part of our specification, for disclosure as to certain details of construction and operation.

Our invention relates to a system of electric motors employed for driving machines which are operated intermittingly at regular periods or intervals.

In a previous application, Serial No. 315,189, filed August 4, 1919, we have disclosed a system in which our invention is specifically described as embodied in an assemblage constituted of a plurality of lines of machines with a plurality of groups of motors for operating the machines of each line independently, intermittingly and alternately, with relation to the other line, and to the said application reference may be had for information as to some of the proposed uses of such assemblage. The present application comprises matter divided out from the application above referred to.

Our invention has for its object the provision of a simple but highly efficient arrangement whereby an electric motor, or a group of such motors in parallel, can be driven intermittingly in recurring time cycles of predetermined time length each, so that the machine or machines operated thereby will have an effective working period alternating with a period of rest, each of such periods being of substantially equal duration. When we say that the motor is driven intermittingly, we mean that the motor operates during certain periods which alternate with other periods during which latter the motor does not rotate.

We effect the purposes of our invention by supplying one element of the motor with a current of varying frequency, and the other element with a current of constant frequency, which latter should approximate the minimum of the varying frequency current. As in our previous application, the varying frequency current may be supplied by a generator driven at a varying speed.

Our invention will be defined in the specification which follows and set forth in the appended claims.

In the drawings hereto attached,

Figure 1 is a diagram showing a group of motors and the two generators, with the arrangement of the connections from each of the generators to the motors.

Figure 2 is a time-frequency chart, indicating the inter-relations of the currents of constant and varying frequencies which we use.

Referring to the drawings, A indicates a motor, of which there may be one or any other number. Three of such motors are shown. When a plurality of motors is employed, the motors are connected in parallel. Each motor is separately connected to and drives intermittingly a machine designed for the execution of work of any given class, and the number of motors and machines employed will be dependent upon the class or classes of work to be performed in the assemblage.

Through their connected motors, the machines are operated for the period in which they execute their work, and this movement is followed by a period during which latter the motors and their connected machines are at rest. Ordinarily, the alternating periods of work and the periods of rest will be of equal duration, but the respective lengths of these periods may be varied so that one will exceed the other, if it be found desirable. To effect this variation in the operating time of the machines, it is necessary only to provide for the maintenance at its maximum frequency of the varying current supplied to the motor for more than one half of the time during which the machine completes its cycle of work and rest, and vice versa. This proposition is based upon the assumption that the cycle of movement of the machine is divided into two parts, each of approximately 180°, one of such parts being the period during which the machine is operating in the performance of its work, and the other part being the period during which the machine is inoperative or in a position of rest. But either period may be varied as regards its duration with respect to the other. During the periods of rest, the work will be moved or otherwise adjusted according to the exigencies present at the time.

In carrying out our invention, we prefer to use alternating current motors with distributed windings on both stator and rotor, such as the wound rotor type induction motor of commerce, but it is apparent that other types of motors, suitable for our purposes, could be used. Or a constant frequency current may be used, which instead of being equal to the minimum frequency of the varying frequency current, may be equal to the maximum value of the varying frequency current, or of some other approximately constant value, it being noted that in either case power will be taken by that element of the motor which is at the instant connected to the source having the higher frequency.

Referring again to the drawings, B is a generator which through connections $b$, delivers a current of constant frequency to one element of the motor, as for instance, in the present case, to the rotor, and C is a generator which through connections $c$, delivers a current of varying frequency to the other element of the motor, in the present case, to the stator.

The generator B, is driven from any suitable source of power, as D, and at a uniform rate of speed. The generator C is operated at a varying speed from the source of power, by means of a train of gearing E, only two of which are shown, and which will include a plurality of low speed elliptical or irregular gears, so as to impart alternate fast and slow movements of rotation to the said generator C. While we have shown the generators B and C as driven from a common source of power, it is not necessary that they be so driven, and each may be driven separately, but we prefer the method of driving first described, inasmuch as by coupling the generators we are thereby enabled to operate them in the exact timing required. That is to say, that unless our preferred method of driving or its equivalent be used, the motors may not make an invariable number of revolutions during each succeeding operating period, the result of such variation being that parts of the driven apparatus may get out of exact timing or step with other machines which operate alternately therewith. In general, this is a very important consideration in drives of the type which we are now considering, inasmuch as any such inaccuracies will become cumulative in time.

The two alternating current generators referred to, are driven so as to produce currents, one of constant and the other of varying frequency, the relations of which are illustrated diagrammatically in Figure 2, the current of constant frequency being indicated by the base line $b'$, and the current of varying frequency by the curve $c'$, such curve indicating the rising and falling frequencies of the current in relation to the work cycles, each of which is constituted of a given number of seconds. The transition from the normal minimum to the maximum of the varying frequency current is more or less quickly effected, and during the period of such maximum frequency the motor effectively operates its connected machine, following which the motor and the machine come to a position of rest. As an example, we have shown in the diagram, Figure 2, the constant frequency current as one of 30 cycles, and the varying frequency current as one ranging from 30 to 60 cycles, but it will be understood that these figures are illustrative only, and that the minimum frequency and the range therefrom, may be varied, together with the current of constant frequency, which is constant only in its approximate relation to the minimum of the varying frequency current.

The connections may be so made that the magnetic field rotations of the two elements of the motor will be in the same direction around the shaft as an axis, and the speed of the motor in revolutions per second may be readily calculated from the instantaneous frequencies by dividing the differences between the frequencies supplied at each instant to the two elements of the motor, by the number of pairs of poles for which the motor is wound.

If the motor A, of the distributed wound stator and rotor type, be thrown onto the lines $b$ and $c$, at any minimum frequency instant when the frequencies of the two currents coincide, the motor speed will thereafter rise and fall rhythmically as indicated by the curve $c'$. A group of such motors will operate synchronously and without slip when so connected in parallel. When the varying frequency current falls to the minimum, and the two frequencies are again identical, the motor A will come to a position of rest which will be maintained during the interval, and the motor will be firmly held from rotation, notwithstanding any usual mechanical torques which may happen to be present.

Instead of using motors with distributed windings as described, ordinary synchronous motors with direct current excitation might be used. Or squirrel-cage type induction motors with distributed windings connected to the varying frequency source, with the constant frequency source omitted, might be used; but with these constructions difficulties in operating the generators and motors at extremely low and zero speed positions are encountered.

It will be obvious that our present invention will permit the alternate and intermitting operation of machines in a manner heretofore possible only through purely mechanical connections; and that we escape the complex situation involved in the old practice of moving and adjusting the machines and their mechanical driving connections, according to changing forms in the work. The electrical connections between the generators and the motors constitute a simple flexible means admitting of ready and exact adjustment to meet the varying conditions and required positions of the machines or tools as encountered in different classes of work.

What we claim as an invention and desire to secure by Letters Patent is:—

1. In an electric motor drive system, an electric motor, combined with a source of periodically varying frequency electric current, and connections between said current source and the motor.

2. In an electric motor drive system, an electric motor, combined with a source of periodically varying frequency electric current for one element of the motor, a source of approximately constant frequency electric current for the other element of the motor, and connections between said current sources and the respective elements of the motor.

3. In an electric motor drive system, an electric motor, combined with a source of periodically varying frequency electric current for the stator, an independent source of approximately constant electric current for the rotor, and connections between said current sources and the respective elements of the motor.

4. In an electric motor drive system, a group of electric motors, in combination with means to supply current of periodically varying frequency to the motors of said group.

5. In an electric motor drive system, a group of electric motors, in combination with a varying speed generator and connections therefrom to supply current of periodically varying frequency to the motors of said group.

6. In an electric motor drive system, a group of electric motors, in combination with a varying speed generator to supply current of periodically varying frequency to one element of the motors of such group, and means to supply a current of constant frequency to the other element of the motors of said group.

7. In an electric motor drive system, a group of electric motors operating synchronously, in combination with a source of current of periodically varying frequency for one element of the motors of the group, together with an independent source of current for the other element of the said motors, and connections between said current sources and motor elements.

8. In an electric motor drive system, an electric motor, combined with a source of periodically varying frequency electric currents, and connections between the current source and the motor to operate the motor at varying speed, the periodically varying frequency currents being so controlled that the motor makes substantially the same number of revolutions during each recurrent period of rising and falling frequency.

9. The method of driving an electric motor at a varying speed in recurrent periods of rising and falling frequency and in which recurrent periods the motor makes the same total number of revolutions, said method comprising the generation and delivery of a current of constant frequency to one element of the motor and the generation and delivery of a current of varying frequency to the other element of the motor.

10. The method of driving an electric motor at a varying speed in recurrent periods of rising and falling frequency, said method comprising the generation and delivery of a current of constant frequency to one element of the motor, and the generation and delivery of a current of varying frequency to the other element of the motor, the varying frequency current at its minimum and the constant frequency current being of equal value, the motor making the same total number of revolutions in each of said recurrent periods.

11. The method of driving an electric motor at a varying speed in recurrent periods of rising and falling frequency and in which recurrent periods the motor makes the same total number of revolutions, the said method comprising the generation and delivery of a current of constant frequency to one element of the motor and the generation and delivery of a current of varying frequency to the other element of the motor, the varying frequency current rising to its maximum from the fixed frequency of the constant frequency current.

In testimony whereof, we have signed our names at Milwaukee, this 17th day of October, 1919.

R. STANLEY SMITH.
JAS. L. ADAMS, Jr.

Witnesses:
W. F. WOOLARD,
J. F. GERDIS.